US012200836B2

(12) United States Patent
Siefken

(10) Patent No.: US 12,200,836 B2
(45) Date of Patent: Jan. 14, 2025

(54) VISUAL DEVICE FOR INDICATING VALUE OF ENVIRONMENTAL PARAMETER VIA REMOTE PLATFORM

(71) Applicant: Nathan Siefken, San Diego, CA (US)

(72) Inventor: Nathan Siefken, San Diego, CA (US)

( * ) Notice: Subject to any disclaimer, the term of this patent is extended or adjusted under 35 U.S.C. 154(b) by 0 days.

(21) Appl. No.: 18/421,776

(22) Filed: Jan. 24, 2024

(65) Prior Publication Data

US 2024/0260151 A1 Aug. 1, 2024

Related U.S. Application Data

(60) Provisional application No. 63/481,855, filed on Jan. 27, 2023.

(51) Int. Cl.

| | |
|---|---|
| ***H05B 45/20*** | (2020.01) |
| ***G09F 13/00*** | (2006.01) |
| ***H05B 47/165*** | (2020.01) |
| ***H05B 47/19*** | (2020.01) |

(52) U.S. Cl.

CPC ........... *H05B 45/20* (2020.01); *G09F 13/005* (2013.01); *H05B 47/165* (2020.01); *H05B 47/19* (2020.01)

(58) Field of Classification Search

CPC ...... H05B 45/20; H05B 47/165; H05B 47/19; G09F 13/005

See application file for complete search history.

(56) References Cited

U.S. PATENT DOCUMENTS 10,347,163 B1 * 7/2019 Herf .......................... G09G 3/20
2019/0064624 A1 * 2/2019 Liu .......................... G02F 1/163

(Continued)

FOREIGN PATENT DOCUMENTS

KR 10-2014-0001688 A * 1/2014
KR 102071596 B1 * 1/2020
KR 10-2338632 B1 * 12/2021

OTHER PUBLICATIONS

KR20140001688A (Machine Translation on Sep. 20, 2024) (Year: 2014).*

(Continued)

*Primary Examiner* — Michael Le

(74) *Attorney, Agent, or Firm* — Procopio, Cory, Hargreaves & Savitch LLP

(57) ABSTRACT

Traditionally, to obtain surf conditions, a person must visit a website, which can be time-consuming, inconvenient, and unartful, and may lead to distraction. Embodiments of a visual device are disclosed that indicates the value of an environmental parameter, representing a surf condition or other environmental condition, using light, according to a color scale that is mapped to enumeration values of the environmental parameter. The visual device may be functional art, capable of being hung on a wall like a painting, such that it can automatically, seamlessly, and artistically inform the user of the environmental condition. The visual device may comprise a controller that acquires the value of the environmental parameter, in the background, via a connection to a platform, and a local access point for easy configuration of the connection. The platform may enable configuration of the environmental parameter, collect environmental data, and calculate values of the environmental parameter.

17 Claims, 6 Drawing Sheets

(56) References Cited

U.S. PATENT DOCUMENTS

| | | | | |
|---|---|---|---|---|
| 2019/0095515 | A1* | 3/2019 | Buesser ................ | G06N 5/022 |
| 2021/0357686 | A1* | 11/2021 | Bera ...................... | G06V 10/25 |

OTHER PUBLICATIONS

KR102071596B1 (Machine Translation on Sep. 20, 2024) (Year: 2020).*
KR102338632B1 (Machine Translation on Sep. 20, 2024) (Year: 2021).*
International Search Report and Written Opinion mailed May 29, 2024 in PCT/US2024/012791, 12 pages.

* cited by examiner

400

500

VISUAL DEVICE FOR INDICATING VALUE OF ENVIRONMENTAL PARAMETER VIA REMOTE PLATFORM

CROSS-REFERENCE TO RELATED APPLICATIONS

This application claims priority to U.S. Provisional Patent App. No. 63/481,855, filed on Jan. 27, 2023, which is hereby incorporated herein by reference as if set forth in full.

BACKGROUND

Field of the Invention

The embodiments described herein are generally directed to a visual device, and, more particularly, to a visual device for indicating the value of an environmental parameter, such as a surf condition.

Description of the Related Art

Traditionally, to obtain surf conditions, a person must visit a website using a browser executing on a user system, such as a desktop computer, laptop or tablet computer, mobile device, or the like. This can be time-consuming, inconvenient, and unartful, and may lead to the user becoming distracted by other websites or functions of the user system.

SUMMARY

Accordingly, a visual device is disclosed that indicates the value of an environmental parameter, such as surf conditions.

In an embodiment, a visual device comprises: a visual display comprising at least one illumination element configured to emit light in each of a plurality of colors; and a controller electrically connected to the visual display, wherein the controller is configured to periodically execute an operation that comprises receiving a value of an environmental parameter from a remote platform over at least one network, and controlling the at least one illumination element to emit light in one of the plurality of colors that is associated with the value of the environmental parameter.

The operation may further comprise sending a request to the remote platform over the at least one network, wherein the value of the environmental parameter is received in response to the request. The value of the environmental parameter may be one of a finite plurality of enumeration values, wherein each of the finite plurality of enumeration values is associated with a different one of the plurality of colors than the other ones of the finite plurality of enumeration values. The environmental parameter may represent a weather condition in a beach environment. The weather condition may be a surf condition. Periodically executing the operation may comprise executing the operation after each of a plurality of time intervals. The controller may comprise a wireless communication interface that is configured to connect to the at least one network via a wireless connection.

The controller may comprise a local access point, wherein the controller is further configured to execute a software server that provides a service at a fixed address accessible via the local access point, wherein the software server is configured to: generate a graphical user interface with one or more inputs for inputting a connection configuration; receive the connection configuration via the graphical user interface; and establish a connection with the remote platform, through the at least one network, based on the connection configuration. The connection configuration may comprise access information for the at least one network. The connection configuration may comprise a user identifier and credentials for a user account on the remote platform. The local access point may be configured to: connect directly to a user system via a wireless connection; and provide the graphical user interface to the user system via the wireless connection.

The visual device may further comprise a substrate, wherein the at least one illumination element is attached to and protrudes outwards from a surface of the substrate. The at least one illumination element may be formed in a shape that represents a sport. The sport may be board surfing, kite surfing, sailing, parasailing, snowboarding, skiing, or hang-gliding. The at least one illumination element may be formed in a shape of a string of characters that spell a word. The word may be a name of a sport.

In an embodiment, a system comprises: one or more of the visual device; and the remote platform, wherein the remote platform is configured to, for each of the one or more visual devices, acquire a device configuration associated with the visual device, wherein the device configuration defines an environment and the environmental parameter, acquire environmental data from at least one data source, calculate the value of the environmental parameter based on the device configuration and the environmental data, and send the value of the environmental parameter to the controller of the visual device. The remote platform may be further configured to, for each of the one or more visual devices: receive a registration request from the visual device, wherein the registration request comprises a device identifier of the visual device; associate the device identifier with a user identifier of a user account within a server database of the remote platform; and associate the device identifier with a device configuration within the server database, to thereby associate the visual device with the device configuration. Calculating the value of the environmental parameter based on the device configuration and the environmental data may comprise: extracting values of a plurality of features from the environmental data, based on the device configuration; and inputting the values of the plurality of features to a machine-learning model, which is trained to output the value of the environmental parameter based on the values of the plurality of features, to thereby produce the value of the environmental parameter.

In an embodiment, a visual device comprises: a substrate; a visual display comprising at least one illumination element configured to emit light in each of a plurality of colors, wherein the at least one illumination element is attached to and protrudes outwards from a surface of the substrate, and wherein the at least one illumination element is formed in a shape that represents a sport; a memory storing a value-to-color mapping that maps each of the plurality of colors to one of a finite plurality of enumeration values of an environmental parameter, and a controller electrically connected to the visual display, wherein the controller is configured to periodically execute an operation that comprises receiving a value of the environmental parameter from a remote platform over at least one network, and controlling the at least one illumination element to emit light in one of the plurality of colors that is mapped, in the value-to-color mapping, to one of the finite plurality of enumeration values that equals the value of the environmental parameter.

It should be understood that any of the features above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Embodiments of a visual device that indicates the value of an environmental parameter, representing a surf condition or other environmental condition, are disclosed. The visual device may be functional art, capable of being hung on a wall like a painting, such that it can automatically, seamlessly, and artistically inform the user of an environmental condition. This obviates any need by the user to visit a website or otherwise interact with a computing device to ascertain the environmental condition.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
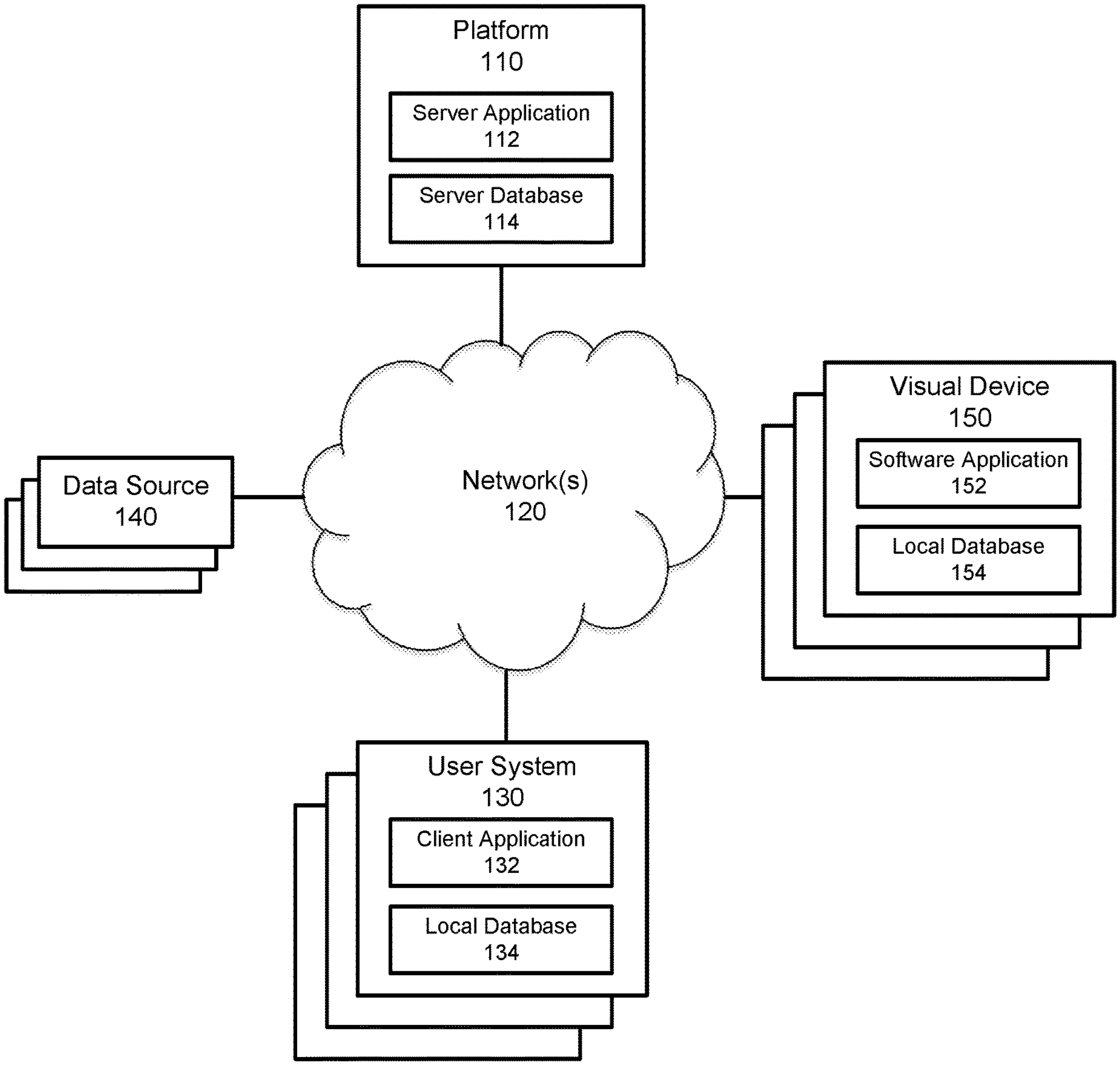
FIG. 1 illustrates an example infrastructure, in which one or more of the processes described herein may be implemented, according to an embodiment.

FIG. 1 illustrates an example infrastructure in which one or more of the disclosed processes may be implemented, according to an embodiment. The infrastructure may comprise a platform 110 (e.g., one or more servers) which hosts and/or executes one or more of the various processes, methods, functions, and/or software modules described herein. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may execute a server application 112 and/or host a server database 114.

Platform 110 may comprise, be communicatively coupled with, or otherwise have access to server database 114. For example, platform 110 may comprise one or more database servers which manage server database 114. Server application 112 may submit data (e.g., user data, form data, etc.) to be stored in server database 114, and/or request access to data stored in server database 114. Any suitable database may be utilized, including without limitation MySQL™, Oracle™, IBM™, Microsoft SQL™, Access™, PostgreSQL™, MongoDB™, and the like, including cloud-based databases and proprietary databases.

Platform 110 may be communicatively connected to one or more user systems 130, data sources 140, and/or visual devices 150, via one or more networks 120. While only a few user systems 130, data sources 140, and visual devices 150 are illustrated, it should be understood that the infrastructure may comprise any number of user systems 130, data sources 140, and visual devices 150. These systems may communicate with platform 110 using one or more application programming interfaces (APIs). For example, server application 112 may provide an application programming interface that includes one or more methods by which another system may acquire data from server application 112, provide data to server application 112, access functionality of server application 112, and/or the like. Similarly, one of the other systems may provide an application programming interface that includes one or more methods by which server application 112 may acquire data from the other system, provide data to the other system, access functionality of the other system, and/or the like.

Network(s) 120 may comprise the Internet, and platform 110 may communicate with other systems, including user system(s) 130, data source(s) 140, and/or visual device(s) 150, through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of systems via the Internet, but may be connected to one or more other systems via an intranet.

User system(s) 130 may comprise any type or types of computing devices capable of wired and/or wireless communication, including without limitation, desktop computers, laptop computers, tablet computers, smartphones or other mobile devices, servers, game consoles, televisions, set-top boxes, electronic kiosks, point-of-sale terminals, and/or the like. However, it is generally contemplated that a user system 130 would be a personal computing device, such as a desktop computer, laptop computer, tablet computer, or smartphone or other mobile device, that can be used to establish and manage a user account with server application 112, as well as configure a visual device 150. Each user system 130 may execute a client application 132 and/or host a local database 134.

Data source(s) 140 may also comprise any type or types of computing devices capable of wired and/or wireless communication. However, it is generally contemplated that a data source 140 would be a third-party server that publishes environmental data. For example, data source 140 may provide an application programming interface (API) that enables server application 112 of platform 110 to acquire or subscribe to the environmental data. While the environmental data may comprise any data related to any environment, in a preferred embodiment, the environmental data comprises weather data related to surf conditions in one or more beach environments. Weather data may include one or more surf-related parameters, such as wave height, wave direction, wave period, swell height, swell direction, swell period, secondary swell, wind wave height, wind wave direction, wind wave period, water temperature, ice coverage, wind speed, wind direction, air temperature, an indication of low tide or high tide, tide direction, time of sunrise, time of sunset, and/or the like. Examples of a data source 140, include any data source that provides composite or individual global weather data from one or a plurality of weather institutes, including the National Oceanic and Atmospheric Administration (NOAA), Deutscher Wetterdienst (i.e., the national meteorological service of Germany), Météo-France (i.e., the national meteorological service of France), the MetOffice (i.e., the national meteorological service of the United Kingdom), the Danish Defence Centre for Operational Oceanography (FCOO), and/or the Icosahedral Nonhydrostatic Model (ICON). Data source(s) 140 are illustrated as remote systems that are separated from platform 110 by network(s) 120. However, in an alternative embodiment, one or more data sources 140 may be comprised in or hosted by platform 110. For example, server database 114 or a subsystem of platform 110 could be a data source 140.

Visual device(s) 150 may also comprise any type or types of computing devices capable of wired and/or wireless communication. However, as will be discussed elsewhere herein, it is generally contemplated that each visual device 150 will be a specialized device that retrieves the value of an environmental parameter from server application 112, and indicates the value of that environmental parameter using a visual display. In an embodiment, the visual display artistically represents the value of the environmental parameter using light, according to a color scale that is mapped to the value of the environmental parameter. Each visual device 150 may execute a software application 152 and/or host a local database 154.

Platform 110 may comprise web servers which host one or more websites and/or web services. In embodiments in which a website is provided, the website may comprise a graphical user interface, including, for example, one or more screens (e.g., webpages) generated in HyperText Markup Language (HTML) or other language. Platform 110 transmits or serves one or more screens of the graphical user interface in response to requests from user system(s) 130. In some embodiments, these screens may be served in the form of a wizard, in which case two or more screens may be served in a sequential manner, and one or more of the sequential screens may depend on an interaction of the user or user system 130 with one or more preceding screens. The requests to platform 110 and the responses from platform 110, including the screens of the graphical user interface, may both be communicated through network(s) 120, which may include the Internet, using standard communication protocols (e.g., HTTP, HTTPS, etc.). These screens (e.g., webpages) may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in server database 114.

In embodiments in which a web service is provided, platform 110 may receive requests from user system(s) 130 and/or visual device(s) 150, and provide responses in a markup language, such as eXtensible Markup Language (XML), JavaScript Object Notation (JSON), YAML Ain't Markup Language (YAML), or the like, and/or in any other suitable or desired format. As mentioned above, platform 110 may provide an application programming interface which defines the manner in which user system(s) 130 and/or visual device(s) 150 may interact with the web service. Thus, user system(s) 130 and/or visual device(s) 150 can define their own user interfaces, and rely on the web service to implement or otherwise provide the backend functionality, storage, and/or the like, described herein. For example, in such an embodiment, client application 132, executing on one or more user systems 130, may interact with server application 112, executing on platform 110, to execute one or more or a portion of one or more of the various processes described herein. Similarly, software application 152, executing on one or more visual devices 150, may interact with server application 112, executing on platform 110, to periodically retrieve the value of an environmental parameter from server application 112 and update a visual display that indicates the value of the environmental parameter.

Client application 132 on user system 130 may be "thin," in which case processing is primarily carried out server-side by server application 112 on platform 110. A basic example of a thin client application 132 is a browser application, which simply requests, receives, and renders webpages at user system(s) 130, while server application 112 on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on platform 110, at any point along this spectrum between "thin" and "thick," depending on the design goals of the particular implementation.

Software application 152 on visual device 150 may similarly be anywhere along the spectrum between "thin" and "thick." However, it is generally contemplated that software application 152 should be as thin as possible. This enables a very lightweight processing system to be used to control the visual display of visual device 150, such that the dimensions (e.g., size and weight), cost, power consumption, and the like, of visual device 150 may be minimized. For example, in a preferred embodiment, visual device 150 is capable of being hung on a wall with a similar footprint as a painting or framed picture.

2. Example Processing Device

Figure 2:
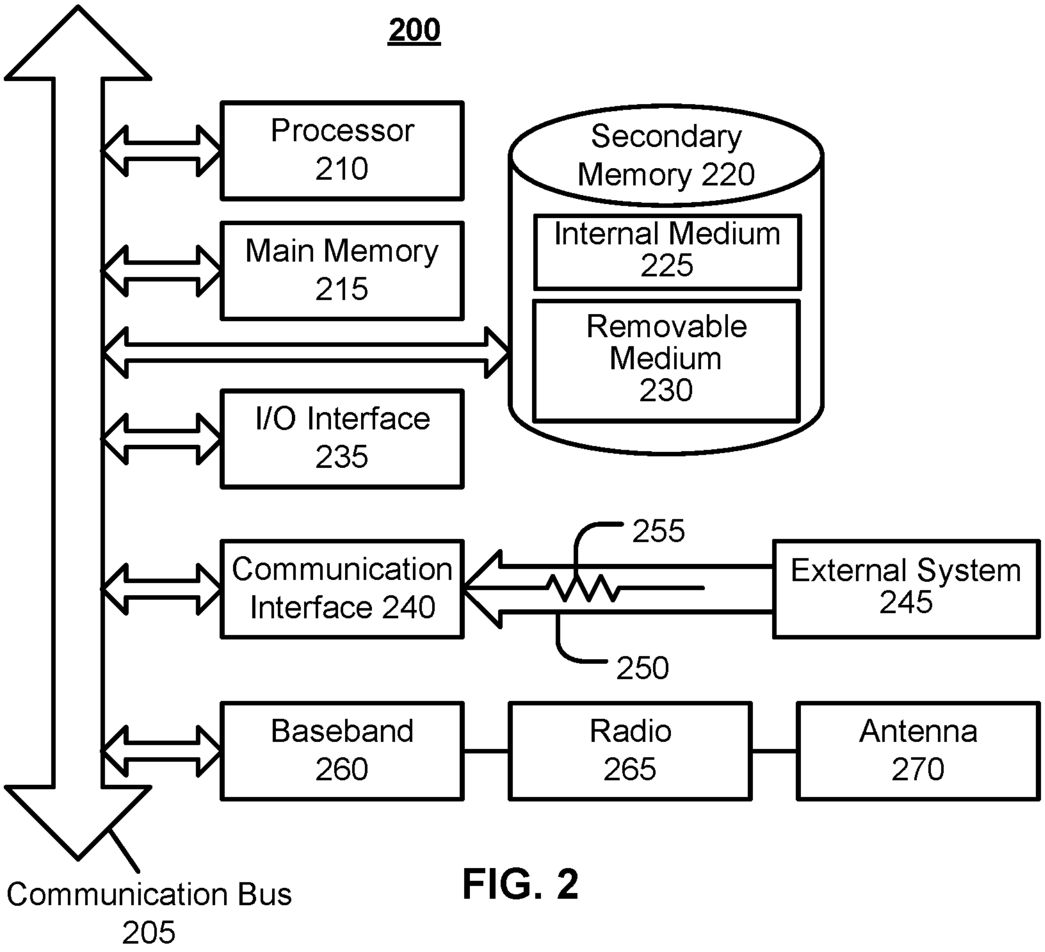
FIG. 2 illustrates an example processing system, by which one or more of the processes described herein may be executed, according to an embodiment.

FIG. 2 is a block diagram illustrating an example wired or wireless system 200 that may be used in connection with various embodiments described herein. For example, system 200 may be used as or in conjunction with one or more of the processes (e.g., to store and/or execute the software) described herein, and may represent components of platform 110, user system(s) 130, data source(s) 140, visual device(s) 150, and/or any other processing devices described herein. System 200 can be any processor-enabled device (e.g., server, personal computer, etc.) that is capable of wired or wireless data communication. Other processing systems and/or architectures may also be used, as will be clear to those skilled in the art.

System 200 may comprise one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 210. Examples of processors which may be used with system 200 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 210 may be connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/5-100, and/or the like.

System 200 may comprise main memory 215. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Python, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 200 may comprise secondary memory 220. Secondary memory 220 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 200. The computer software stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may include an internal medium 225 and/or a removable medium 230. Internal medium 225 and removable medium 230 may be read from and/or written to in any well-known manner. Internal medium 225 may comprise one or more hard disk drives, solid state drives, and/or the like. Removable storage medium 230 may be, for example, a magnetic tape drive, a compact disc (CD) drive, a digital versatile disc (DVD) drive, other optical drive, a flash memory drive, and/or the like.

System 200 may comprise an input/output (I/O) interface 235. I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet computer, or other mobile device).

System 200 may comprise a communication interface 240. Communication interface 240 allows software to be transferred between system 200 and external devices (e.g. printers), networks, or other information sources. For example, computer-executable code and/or data may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 240 is generally in the form of electrical communication signals 255. These signals 255 may be provided to communication interface 240 via a communication channel 250 between communication interface 240 and an external system 245. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 215 and/or secondary memory 220. Computer-executable code can also be received from an external system 245 via communication interface 240 and stored in main memory 215 and/or secondary memory 220. Such computer-executable code, when executed, may enable system 200 to perform the various functions of the disclosed embodiments as described elsewhere herein.

In an embodiment that is implemented using software, the software may be stored on a computer-readable medium and initially loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the functions described elsewhere herein.

System 200 may comprise wireless communication components that facilitate wireless communication over a voice network and/or a data network (e.g., in the case of user system 130 or visual device 150). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive signal, which is sent from radio system 265 to baseband system 260.

Baseband system 260 is communicatively coupled with processor(s) 210, which have access to memory 215 and 220. Thus, software can be received from baseband processor 260 and stored in main memory 210 or in secondary memory 220, or executed upon receipt. Such software, when executed, can enable system 200 to perform various functions of the disclosed embodiments.

3. Example Processes

Figure 3:
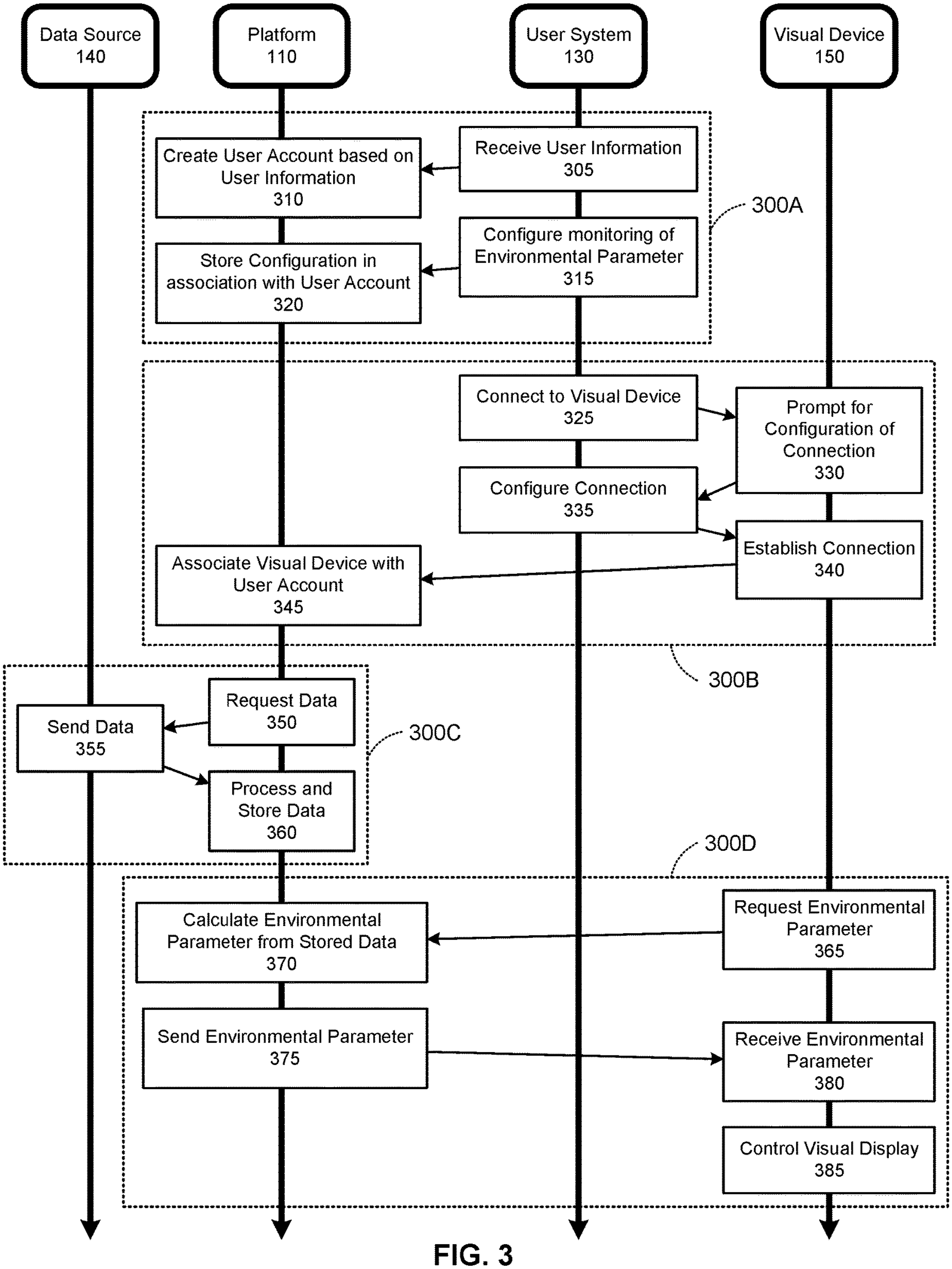
FIG. 3 illustrates processes for supporting a visual device that indicates the value of an environmental parameter, according to an embodiment.

FIG. 3 illustrates processes 300 for supporting a visual device 150, according to an embodiment. It should be understood that the described processes 300 may be embodied in one or more software modules that are executed by one or more hardware processors (e.g., processor 210), for example, as a software application on the respective system (e.g., server application 112 on platform 110, client application 132 on user system 130, software application 152 on visual device 150, etc.). Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components.

To clearly illustrate the interchangeability of hardware and software, the processes are generally described herein in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a process is for ease of description. Specific functions can be moved from one process to another process without departing from the invention.

Furthermore, while the processes, described herein, are illustrated with a certain arrangement and ordering of subprocesses, each process may be implemented with fewer, more, or different subprocesses and a different arrangement and/or ordering of subprocesses. It should also be understood that any subprocess, which does not depend on the completion of another subprocess, may be executed before, after, or in parallel with that other independent subprocess, even if the subprocesses are described or illustrated in a particular order.

3.1. Registration of User Account

Process 300A represents a registration process for a user account. Process 300A comprises subprocesses 305-320. Subprocesses 305 and 315 may be performed by user system 130, and subprocesses 310 and 320 may be performed by platform 110. In particular, subprocesses 305 and 315 may be performed by client application 132, and subprocesses 310 and 320 may be performed by server application 112. Any of the described communications between platform 110 and user system 130 may be conducted over network(s) 120.

In subprocess 305, user information may be received from a user of user system 130. In particular, the user may access a website provided by platform 110 (e.g., via server application 112), which may provide a graphical user interface, comprising one or more screens, for creating a new user account, via a client application 132 (e.g., a browser). Alternatively, the user may download a client application 132 (e.g., mobile app) to user system 130, and launch the downloaded client application 132, which may provide the graphical user interface for creating a new user account. In either case, the graphical user interface may prompt the user for the user information and comprise one or more inputs for inputting the user information. The user information may comprise a unique user identifier (e.g., username or email address), user credentials for authentication (e.g., a username and/or email address and password), contact information for the user (e.g., user's first and last name, telephone number, address, email address, etc.), user preferences, and/or the like. Once the user has input the user information into the graphical user interface, the user may submit the user information by selecting an input of the graphical user interface. This submission may trigger user system 130 to send the user information over network(s) 120 to platform 110.

In subprocess 310, a user account is created for the user based on the user information that was received and sent by user system 130 in subprocess 305. In particular, server application 112 may confirm that the user information is acceptable (e.g., a user account has not already been registered for the same username or email address, the password satisfies a security policy, no user information is missing, etc.). When confirming that the user information is acceptable, server application 112 may generate and store a new data object, comprising the user information, within server database 114. This data object represents a new user account for the user, which may be identified by a unique user identifier (e.g., username, email address, or an internal identifier).

In subprocess 315, the user may configure the monitoring of an environmental parameter to be indicated by a visual device 150. In particular, after the user account is created in subprocess 310, the graphical user interface may redirect the user to one or more screens for specifying a device configuration. Alternatively or additionally, the user may navigate to these screen(s), via navigational inputs of the graphical user interface, at any time after signing into the user's user account. The graphical user interface may comprise one or more inputs for inputting the value of each of one or more device settings in the device configuration. These device setting(s) may include, without limitation, device identifier, one or more geographical locations (e.g., beaches) representing the environment of interest, an identification of the environmental parameter of interest, one or more time ranges over which visual device 150 should operate in a sleep mode (e.g., sleep scheduler that can be configured and/or toggled on and off), user's ability in the sport being represented by visual device 150 (e.g., beginner, intermediate, advanced), a color to be used by the visual display of visual device 150 (e.g., whether to use one of a plurality of fixed colors, or a value-to-color mapping according to real-time environmental conditions), and/or the like. In other words, the device configuration may define an environment, comprising one or more geographical locations, and a parameter of that environment to be indicated by visual device 150. Once the user has input the value of each device setting into the graphical user interface, the user may submit the device configuration, comprising the value of each device setting, via an input of the graphical user interface. This submission may trigger user system 130 to send the device configuration over network(s) 120 to platform 110.

In subprocess 320, the device configuration, received from user system 130, is stored in association with the user account that was created in subprocess 310 for the user (e.g., in a user configuration table that is associated with the user account). In particular, server application 112 may store the device configuration, including the value of each device setting, in association with the user account in server database 114. Subsequently, the user may modify the value of any device setting in any device configuration, via a subsequent iteration of subprocesses 315-320, by signing into the user's user account (e.g., using the credentials associated with the user account), navigating to the relevant screen(s) in the graphical user interface, selecting the device configuration to be modified, inputting a new value for one or more device settings of the selected device configuration, and then resubmitting the new value(s) of the device setting(s) for the selected device configuration. In addition, in an embodiment, a user may create a plurality of device configurations via a plurality of iterations of subprocesses 315-320. Thus, whereas subprocesses 305-310 may only need to be performed once for each user, an iteration of subprocesses 315-320 may be performed once or a plurality of times, depending on whether or not the user subsequently modifies a device configuration and/or how many device configurations the user creates.

3.2. Configuration of Visual Device

Process 300B represents a registration process for a visual device 150. Process 300B comprises subprocesses 325-345. Subprocesses 325 and 335 may be performed by user system 130, subprocesses 330 and 340 may be performed by visual device 150, and subprocess 345 may be performed by platform 110. In particular, subprocesses 325 and 335 may be performed by client application 132, subprocesses 330 and 340 may be performed by software application 152 on visual device 150, and subprocess 345 may be performed by server application 112. Any of the described communications between platform 110 and visual device 150 may be conducted over network(s) 120, whereas any of the described communications between user system 130 and visual device 150 may be conducted over a direct wired or wireless connection.

In subprocess 325, user system 130 may establish a connection with visual device 150. This connection may be a wired connection, in which case one end of a cable (e.g., Universal Serial Bus (USB) cable) may be inserted into a socket (e.g., USB port) of user system 130 and the other end of the cable may be inserted into a socket (e.g., USB port) of visual device 150. However, in a preferred embodiment, the connection is a wireless connection. In such an embodiment, visual device 150 may comprise an antenna 270 that utilizes a standard mid-range (e.g., around 10-300 meters) wireless communication technology, such as Wi-Fi™ or Zigbee™ or a standard short-range (e.g., around 10 meters) wireless communication technology, such as Bluetooth™.

In a preferred embodiment, Wi-Fi™ is used for the connection between user system 130 and visual device 150. In this case, visual device 150 can utilize the same antenna 270 to establish both a direct connection with user system 130 and an indirect connection to platform 110 via network(s) 120. In particular, visual device 150 may utilize Wi-Fi™ provisioning as a means to connect to network(s) 120, instead of having to hard-code network credentials into visual device 150. Provisioning generally refers to the process of preparing and configuring a network to enable the network to provide new services. In the present context, provisioning refers to the provision of network credentials, through the connection to user system 130, that enable visual device 150 to connect to a wireless network (e.g., local area network (LAN), operated by or otherwise accessible to the user) and obtain an IP address on the wireless network. In turn, this enables visual device 150 to communicate with platform 110 over network(s) 120, which include the wireless network.

In this regard, visual device 150 may comprise a local access point (e.g., comprising antenna 270). Software application 152, executing on visual device 150, may comprise a software server that provides a service at a fixed IP address (e.g., 192.168.4.1) accessible via the local access point. The software server may be configured to broadcast a service set identifier (SSID), using the Wi-Fi™ communication protocol, to identify visual device 150. User system 130 may detect the SSID, also using the Wi-Fi™ communication protocol, and connect to the local access point of visual device 150 (e.g., in response to a user operation within the graphical user interface of client application 132). In an embodiment, a basic password (e.g., "password") may be required to connect to the local access point. This password may be fixed or, alternatively, may be changeable by the user, via the graphical user interface, after the connection to the local access point has been established.

In subprocess 330, regardless of how the connection between visual device 150 and user system 130 is established, the user may be prompted to specify connection information for a connection between visual device 150 and platform 110. In particular, once a wired or wireless connection has been established between visual device 150 and user system 130, the software server, executing on visual device 150, may generate a graphical user interface, comprising one or more screens for specifying a connection configuration, and send the graphical user interface to user system 130. The graphical user interface may be displayed by client application 132 (e.g., browser, mobile app, etc.) on a display of user system 130. The graphical user interface may comprise one or more inputs for inputting the value of each of one or more connection settings in the connection configuration. These connection setting(s) may include, without limitation, access information for a wireless network, account information for the user's user account, a frequency at which visual device 150 should communicate with platform 110 via the connection being configured, the selection of one or more colors to be used in the visual display of visual device 150, potentially mapped in a value-to-color mapping to the value or ranges of values of the environmental parameter to be indicated by visual device 150, and/or the like. The access information for a wireless network may comprise an identifier (e.g., SSID) of the wireless network (e.g., LAN) through which visual device 150 can access platform 110, credentials (e.g., password), if any, required to access the wireless network, and/or the like. The account information may comprise a user identifier (e.g., username or email address) for the user account, credentials (e.g., password) required to sign in to the user account, and/or the like.

In subprocess 335, the user may configure the connection between visual device 150 and platform 110 by specifying each of the connection setting(s). In particular, the user may input the value of each connection setting in the connection configuration into the graphical user interface, and then submit the connection configuration via an input of the graphical user interface. This submission may trigger user system 130 to send the configuration information to visual device 150, over the direct connection between user system 130 and visual device 150. Notably, since the connection configuration, which may include the password to the user's personal LAN, is sent over a direct connection between user system 130 and visual device 150, this sensitive information is not in danger of being intercepted by a malicious actor.

In subprocess 340, visual device 150 may establish a connection with platform 110, based on the connection configuration that was submitted in subprocess 335. For example, visual device 150 may comprise a wireless communication interface (e.g., communication interface 240 in conjunction with baseband 260, radio 265, and antenna 270) that is configured to connect to the wireless network, specified in the connection configuration (e.g., using the SSID and credentials in the connection configuration), and thereby connect to platform 110 via network(s) 120. Visual device 150 may also store the connection configuration in non-volatile local memory (e.g., secondary memory 220) for subsequent usage.

When a connection is successfully established between visual device 150 and platform 110, software application 152, executing on visual device 150, may notify the user that the connection was successful via the graphical user interface being sent to and displayed by client application 132 on the display of user system 130. Conversely, when a connection is unable to be established between visual device 150 and platform 110 using the submitted connection configuration, software application 152 may instead notify the user that the connection was unsuccessful and/or prompt the user to reenter the connection setting(s) via the graphical user interface.

In subprocess 345, once a connection has been successfully established between visual device 150 and platform 110 over network(s) 120, server application 112, executing on platform 110, may associate visual device 150 with the user account. In particular, visual device 150 may send a registration request to server application 112. The registration request may comprise a unique device identifier of visual device 150, such as a Media Access Control (MAC) identifier, and potentially, a user identifier (e.g., username or email address) of the user account. In an embodiment, the registration request may require visual device 150 to authenticate with platform 110, using the account information from the connection configuration. Server application 112 may associate the device identifier with the user identifier within server database 114, to thereby register the visual device 150 to the user account.

It should be understood that process 300B may only need to be performed once for each visual device 150. However, a user may register a plurality of visual devices 150 to a single user account by performing an iteration of process 300B for each visual device 150 to be registered. In an embodiment, each visual device 150 may be assigned a device configuration, independently from any other visual device 150. In particular, the device identifier of each visual device 150 may be associated with a device configuration (e.g., an identifier of the device configuration) within server database 114, to thereby associate the visual device 150 with the device configuration. Thus, for example, the user may create a first and second device configuration via iterations of subprocesses 315-320, register a first and second visual device 150 via two iterations of process 300B, assign the first device configuration to the first visual device 150, and assign the second device configuration to the second visual device 150. It should be understood that the user could also assign the same device configuration to two or more visual devices 150. In an alternative embodiment, the user account may be associated with only a single device configuration, and all visual devices 150 may be assigned that single device configuration.

In an embodiment, to assign a device configuration to a visual device 140, a user may utilize process 300B to register the visual device 140, then sign in to the user's user account, and utilize one or more inputs in the graphical user interface to assign a device configuration (e.g., created via an iteration of subprocesses 315-320) to the registered visual device 150. As discussed elsewhere herein, the device configuration may define the environment and environmental parameter to be indicated by visual device 150 to which the device configuration is assigned. In an alternative or additional embodiment, the device configuration may be specified by the user in subprocess 335 (e.g., when inputting the connection setting(s)), and included in the registration request. In this case, the device configuration may be associated with the visual device 150 at the time of registration.

3.3. Acquisition of Data

Process 300C represents a collection process for environmental data. Process 300C comprises subprocesses 350-360. Subprocesses 350 and 360 may be performed by platform 110, and subprocess 355 may be performed by data source 140. In particular, subprocesses 350 and 360 may be performed by server application 112, and subprocess 355 may be performed by a web service executing on data source 140. Any of the described communications between platform 110 and data source 140 may be conducted over network(s) 120.

In subprocess 350, platform 110 may request data from data source 140. In particular, server application 112, executing on platform 110, may perform a remote procedure call, over network(s) 120, to a GET method, defined in the application programming interface of data source 140, to request environmental data from data source 140. The environmental data may be requested for each individual device configuration stored in association with each user account within server database 114 on platform 110, or may be requested collectively for all device configurations stored in association with user accounts within server database 114 on platform 110.

In subprocess 355, data source 140 may send data in response to the request in subprocess 350. In particular, a web service, executing on data source 140, may retrieve and send the environmental data, requested by server application 112, to server application 112 over network(s) 120. In this manner, platform 110 may acquire environmental data from data source 140.

In subprocess 360, platform 110 may process and store the data returned by data source 140 in subprocess 355. In particular, the environmental data, returned by data source 140, may be formatted into a standardized format and stored (e.g., in an environmental data table) within server database 114. The formatting may comprise converting units of one or more values in the environmental data into a common standard unit of measure, converting the time zone of the environmental data into a single standard time zone, and/or the like. Environmental parameters may be derived, from the stored environmental data, when needed by a visual device 150.

It should be understood that process 300C may be performed repeatedly for a single data source 140 or each of a plurality of data sources 140. For example, process 300C could be performed periodically, according to a fixed time interval (e.g., every minute, every five minutes, every fifteen minutes, every thirty minutes, every hour, every N hours, in which N is any integer greater than one, etc.), for each data source 140. Alternatively, process 300C could be performed each time the value of an environmental parameter is requested by a visual device 150.

In an alternative embodiment, instead of platform 110 pulling environmental data from data source 140, data source 140 pushes environmental data to platform 110. In this case, data source 140 could periodically, according to a fixed time interval (e.g., every minute, every five minutes, every fifteen minutes, every thirty minutes, every hour, every N hours, in which N is any integer greater than one, etc.), post the environmental data to server application 112 via a remote procedure call, over network(s) 120, to a method provided by an application programming interface of server application 112.

3.4. Operation of Visual Device

Process 300D represents the operation of a visual device 150. Process 300D comprises subprocesses 365-385. Subprocesses 365, 380, and 385 may be performed by visual device 150, and subprocesses 370 and 375 may be performed by platform 110. In particular, subprocesses 365, 380, and 385 may be performed by software application 152, and subprocesses 370 and 375 may be performed by server application 112. Any of the described communications between platform 110 and visual device 150 may be conducted over network(s) 120.

In subprocess 365, visual device 150 requests the value of an environmental parameter from platform 110. In particular, visual device 150 may connect to platform 110 using the connection configuration submitted in subprocess 335, and send a request for the value of the environmental parameter to server application 112. The request may be sent via a remote procedure call by software application 152, executing on visual device 150, to a GET method provided by the application programming interface of server application 112. The request may comprise the device identifier of visual device 150. The request could also comprise the account information (e.g., username or email address and credentials) for the user's user account, as provided in the connection configuration submitted in subprocess 335, in order to authenticate visual device 150 to platform 110.

In subprocess 370, platform 110 may calculate the value of the environmental parameter, in response to the request from visual device 150. In particular, server application 112 may receive the request sent by visual device 150 in subprocess 365, retrieve the device configuration, associated with the visual device 150, from server database 114, based on the device identifier in the request, and calculate the value of the environmental parameter for the environment, specified in the device configuration, from the environmental data stored within server database 112 by one or more iterations of process 300C. In other words, the value of the environmental parameter is calculated based on the device configuration and the environmental data.

The value of the environmental parameter may be calculated as a numerical rating or other score using an algorithm that aggregates the values of a plurality of features. The values of the plurality of features may be extracted from the environmental data, based on the device configuration. In particular, subprocess 370 may, for each of the plurality of features, extract the value, from the environmental data that correspond to the environment defined in the device configuration. The aggregation may weight two or more of these features differently to determine the numerical score for the environmental parameter.

In an embodiment, a machine-learning model may be used to calculate the value of the environmental parameter from the plurality of features. In this case, the machine-learning model may be trained using supervised learning. In particular, a training dataset may be generated that comprises labeled feature vectors, in which each feature vector comprises a value for each of the plurality of features and is labeled with a target value for the environmental parameter. The machine-learning model may be trained by minimizing the error between the output of the machine-learning model for each feature vector and the target value with which that feature vector is labeled. In other words, the machine-learning model is trained to output the value of the environmental parameter based on the values of the plurality of features. Once trained to a suitable accuracy, the machine-learning model may be deployed to determine the value of the environmental parameter from real-time values of the plurality of features. Examples of suitable machine-learning models include, without limitation, an artificial neural network, random forest algorithm, linear regression algorithm, logistic regression algorithm, decision tree, support vector machine (SVM), naïve Bayes algorithm, k-Nearest Neighbors (kNN) algorithm, K-means algorithm, dimensionality reduction algorithm, gradient-boosting algorithm, and the like.

In an embodiment, the value (e.g., numerical score) of the environmental parameter is one of a finite plurality of enumeration values (e.g., integers). In this case, subprocess 370 (e.g., machine-learning model) may be a classifier that classifies a feature vector, comprising a value of each of the plurality of features, into one of a finite plurality of classes. Alternatively, subprocess 370 may calculate a value over a continuous range of values, and then quantize this value into one of a finite plurality of classes. The number of enumeration values, which the value of the environmental parameter may be, may depend on the particular design goals of visual device 150, and may depend on the color scale (e.g., number of light colors) that is representable by the visual display of visual device 150. In one particular example, there may be six possible enumeration values, such that the value of the environmental parameter may be zero, one, two, three, four, or five.

One of the enumeration values (e.g., zero) may indicate that visual device 150 should operate in a sleep mode, as opposed to indicating the actual value of the environmental parameter. In this case, calculating the value of the environmental parameter may comprise determining whether the current time is within a time range that was specified, in the device configuration, for the sleep mode. When determining that the current time is within the time range specified for the sleep mode, the value of the environmental parameter may be set to the enumeration value (e.g., zero) representing the sleep mode. Otherwise, when determining that the current time is not within the time range specified for the sleep mode, the value of the environmental parameter may be calculated to reflect an environmental condition, as described above.

In an embodiment, the environmental parameter represents a weather condition, such as a surf condition, in an environment, such as one or more beaches. In the specific case that the environmental parameter represents a surf condition in a beach environment, the plurality of features may include, without limitation, wave height, wave direction, wave period, swell height, swell direction, swell period, secondary swell, wind wave height, wind wave direction, wind wave period, water temperature, ice coverage, wind speed, wind direction, air temperature, an indication of low tide or high tide, tide direction, time of sunrise, time of sunset, and/or the like, for the beach environment. In an embodiment in which the value of the environmental parameter, representing the surf condition, may be one of six enumeration values, a value of zero may represent a sleep mode, a value of one may represent poor surf conditions, a value of two may represent fair surf conditions, a value of three may represent good surf conditions, a value of four may represent ideal surf conditions, and a value of five may represent dangerous surf conditions (e.g., dangerously high surf).

In subprocess 375, regardless of how the environmental parameter is calculated, platform 110 sends the calculated value of the environmental parameter to visual device 150, as a response to the request sent in subprocess 365. In particular, server application 112, executing on platform 110, may send the calculated value of the environmental parameter (e.g., in a JSON objet), over network(s) 120, to software application 152, executing on visual device 150.

In subprocess 380, visual device 150 receives the value of the environmental parameter, sent by platform 110 in subprocess 375. As discussed above, the value of an environmental parameter may be a numerical score of an environmental condition, such as a surf condition or other weather condition. The numerical score may be an integer, which may represent, for example, one of a finite plurality of enumeration values. To minimize the computational resources required at visual device 150, all or a substantial portion of processing of the environmental parameter may be performed by server application 112 on platform 110, such that the value of the environmental parameter received in subprocess 380 may be used with little to no additional processing. This enables visual device 150 to be a lightweight device, in terms of dimensions (e.g., size and weight) and power consumption, as well as facilitating and reducing the cost of manufacturing visual device 150.

In subprocess 385, visual device 150 may control a visual display based on the value of the environmental parameter, received in subprocess 380. For example, as will be discussed elsewhere herein, the color of one or more illumination elements in the visual display may be updated to reflect the value of the environmental parameter, according to a value-to-color mapping stored in visual device 150. It should be understood that, when the value of the environmental parameter has not changed since the last iteration of process 300D, the color of the illumination element(s) in visual display may not change at all in subprocess 385. Conversely, when the value of the environmental parameter has changed since the last iteration of process 300D, the color of illumination element(s) in the visual display may change from a first color to a second color.

The value-to-color mapping may be fixed or configurable (e.g., via the connection setting(s) in the connection configuration). In either case, the value-to-color mapping may map each of the plurality of enumeration values for the environmental parameter to one of a plurality of colors. Each of the plurality of enumeration values may be mapped to a different one of the plurality of colors than all other ones of the plurality of enumeration values, such that there is a one-to-one mapping of values to colors.

Each illumination element may be configured to emit light in each of the plurality of colors. During operation, the illumination element will emit light in the color that is associated with the current value of the environmental parameter, received in subprocess 380. In other words, in subprocess 385, visual device 150 controls at least one illumination element in the visual display of visual device 150 to emit light in a color that is mapped to the value of the environmental parameter in the value-to-color mapping, to thereby indicate the value of the environmental parameter.

It should be understood that process 300D may be performed repeatedly for each visual device 150. For example, process 300D could be performed periodically according to a fixed time interval, as defined in the connection configuration submitted for the visual device 150 in subprocess 335. In other words, the operation of visual device 150, in subprocesses 365, 380, and 385, may be periodically executed after each of a plurality of time intervals. The shorter the time interval, the greater the temporal resolution of indications of the environmental parameter that will be provided in the visual display of visual device 150. It is generally contemplated that the fixed time interval would be on the order of minutes (e.g., one minute, three minutes, five minutes, ten minutes, fifteen minutes, etc.). Thus, the visual display of visual device 150 is updated periodically to reflect real-time environmental conditions.

4. Example Machine-Learning Model

Figures 4, 5:
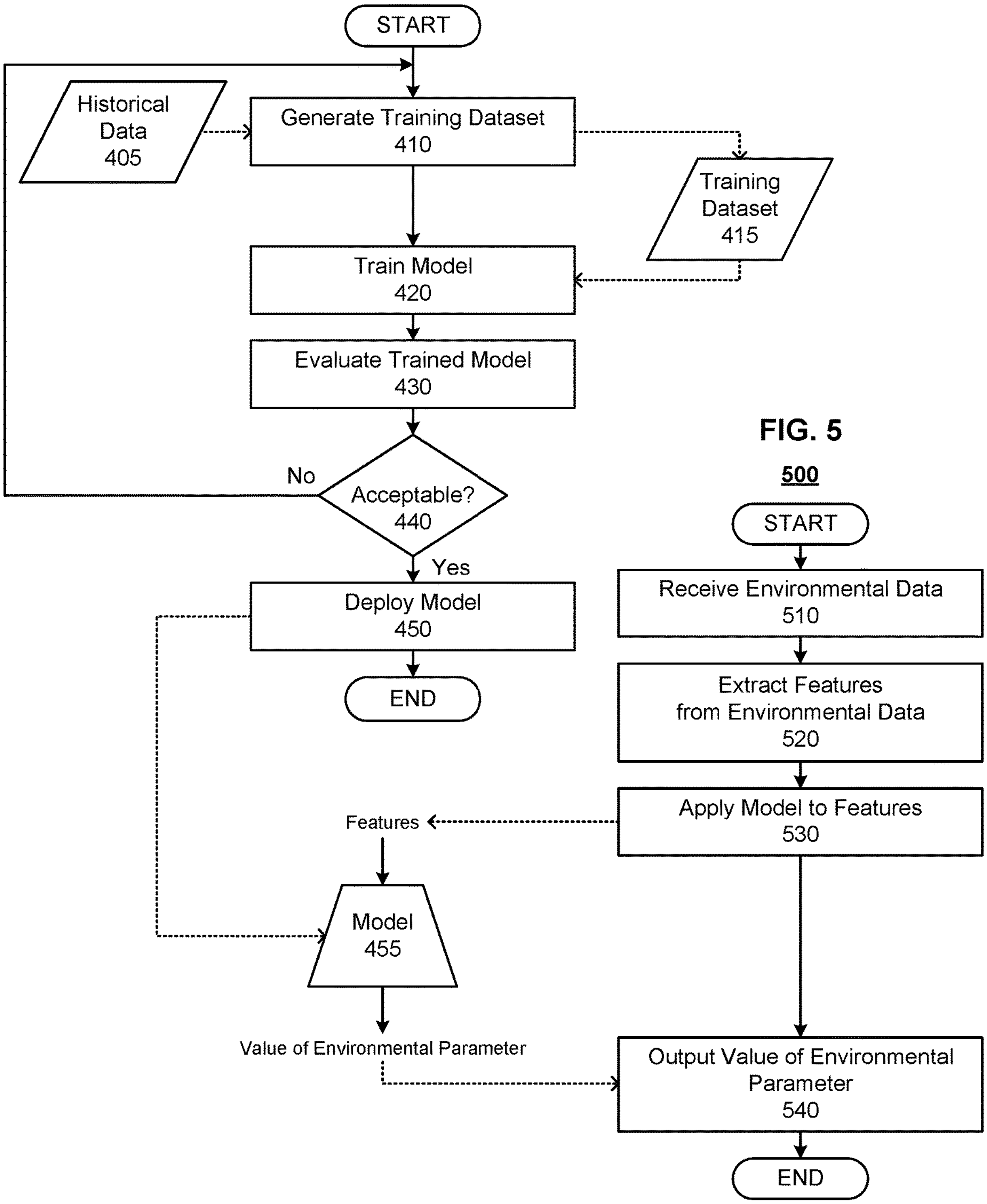
FIG. 4 illustrates a process for training a machine-learning model for calculating the value of an environmental parameter, according to an embodiment.
FIG. 5 illustrates a process for operating a machine-learning model for calculating the value of an environmental parameter, according to an embodiment.

FIG. 4 illustrates a process 400 for training a machine-learning model for calculating the value of an environmental parameter, according to an embodiment. It is generally contemplated that process 400 would be implemented by server application 112, executing on platform 110. However, process 400 could be implemented by any software, hardware, or combination of software and hardware. In addition, while process 400 is illustrated with a certain arrangement and ordering of subprocesses, process 400 may be implemented with fewer, more, or different subprocesses and a different arrangement and/or ordering of subprocesses. It should also be understood that any subprocess, which does not depend on the completion of another subprocess, may be executed before, after, or in parallel with that other independent subprocess, even if the subprocesses are described or illustrated in a particular order.

The goal of process 400 is to train a machine-learning model to accurately output the value of an environmental parameter based on the values of a plurality of features. Process 400 may be performed under the guidance of a developer, working on behalf of an operator of platform 110.

The input to process 400 may be historical data 405 comprising or consisting of historical values of the plurality of features at a plurality of different past times. It should be understood that the plurality of features should represent variables that are relevant to the environmental parameter. For example, if the environmental parameter is a surf condition, the plurality of features should comprise surf-related parameters, as discussed elsewhere herein. Similar features can be engineered for other environmental conditions.

In subprocess 410, a training dataset 415 is generated from historical data 405. In an embodiment, training dataset 415 comprises a plurality of labeled feature vectors. Each feature vector contains the value of each of the plurality of features, in historical data 405, and is labeled with a target value, representing the ground-truth value of the environmental parameter for that feature vector. The values of the plurality of features may be standardized and/or normalized (e.g., converted to common units of measure) when converting historical data 405 into feature vectors. As discussed elsewhere herein, the value of the environmental parameter may be one of a finite plurality of enumeration values. In this case, each target value may also be one of the finite plurality of enumeration values. The target value for each feature vector in training dataset 415 may be determined manually (e.g., via panels with domain expertise), automatically (e.g., using weather models), or semi-automatically (e.g., using weather models and panels with domain expertise).

In subprocess 420, the machine-learning model is trained using training dataset 415. In particular, the machine-learning model may be trained by minimizing a loss function over a plurality of training iterations. In each training iteration, one feature vector from training dataset 415 may be input to the machine-learning model to output a value of the environmental parameter, the loss function may calculate an error between the output value and the target value with which the feature vector is labeled, and one or more weights in the machine-learning model may be adjusted, according to a suitable technique (e.g., gradient descent), to reduce the error. A training iteration may be performed for each of at least a major subset of labeled feature vectors in training dataset 415. A remainder of the training dataset 415 may be used for evaluation of the trained machine-learning model. Examples of suitable machine-learning models include, without limitation, an artificial neural network, random forest algorithm, linear regression algorithm, logistic regression algorithm, decision tree, support vector machine (SVM), naïve Bayes algorithm, k-Nearest Neighbors (kNN) algorithm, K-means algorithm, dimensionality reduction algorithm, gradient-boosting algorithm, and the like.

In subprocess 430, the machine-learning model, trained in subprocess 420, may be evaluated. The evaluation may comprise validating and/or testing the machine-learning model using a portion of training dataset 415 that was not used to train the machine-learning model in subprocess 420. The result of subprocess 430 may be a performance measure for the machine-learning model, such as an accuracy of the machine-learning model. The evaluation in subprocess 430 may be performed in any suitable manner.

In subprocess 440, it is determined whether or not the machine-learning model, trained in subprocess 420, is acceptable based on the evaluation performed in subprocess 430. For example, the performance measure from subprocess 440 may be compared to a threshold or one or more other criteria. If the performance measure satisfies the criteria (e.g., is greater than or equal to the threshold), the machine-learning model may be determined to be acceptable (i.e., "Yes" in subprocess 440). Conversely, if the performance measure does not satisfy the criteria (e.g., is less than the threshold), the machine-learning model may be determined to be unacceptable (i.e., "No" in subprocess 440). When the machine-learning model is determined to be acceptable (i.e., "Yes" in subprocess 440), process 400 may proceed to subprocess 450. Otherwise, when the machine-learning model is determined to be unacceptable (i.e., "No" in subprocess 440), process 400 may return to subprocess 410 to retrain the machine-learning model (e.g., using a new training dataset 415).

In subprocess 450, the trained machine-learning model may be deployed as machine-learning model 455. In an embodiment, machine-learning model 455 receives the values of a plurality of features of environmental data as an input, and outputs the value of an environmental parameter. Machine-learning model 455 may be deployed by moving machine-learning model 455 from a development environment to a production environment of platform 110. For example, machine-learning model 455 may be made available at an address on platform 110 (e.g., in a microservice architecture) that is accessible to server application 112 in subprocess 370. Alternatively, machine-learning model 455 may be comprised in server application 112.

FIG. 5 illustrates a process 500 for operating machine-learning model 455 for calculating the value of an environmental parameter, according to an embodiment. Process 500 may be executed within subprocess 370 to calculate the value of the environmental parameter. Thus, it is generally contemplated that process 500 would be implemented by server application 112, executing on platform 110, or as a service that is accessible to server application 112. However, process 500 could be implemented by any software, hardware, or combination of software and hardware. In addition, while process 500 is illustrated with a certain arrangement and ordering of subprocesses, process 500 may be implemented with fewer, more, or different subprocesses and a different arrangement and/or ordering of subprocesses. It should also be understood that any subprocess, which does not depend on the completion of another subprocess, may be executed before, after, or in parallel with that other independent subprocess, even if the subprocesses are described or illustrated in a particular order.

Initially, in subprocess 510, environmental data may be received. For example, environmental data relevant to the environment indicated in the device configuration for a visual device 150 may be retrieved from server database 114 (e.g., from an environmental data table) or directly from a data source 140. The environmental data may represent current data for the environment in the device configuration. It should be understood that "current" in this context may mean at the current time or within a recent time window extending into the past from the current time. This time window may be the same size as the time interval between iterations of process 300C.

In subprocess 520, the value of each of the plurality of features may be extracted from the environmental data received (e.g., retrieved) in subprocess 510. The values of the plurality of features may be extracted in the same manner as they were extracted from historical data 405, in subprocess 410, to generate the feature vectors in training dataset 415. This extraction may include standardizing and/or normalizing the values of the plurality of features in the same manner as in subprocess 410.

In subprocess 530, machine-learning model 455, which was trained in subprocess 420 of process 400 and deployed by subprocess 450 of process 400, may be applied to the features, extracted in subprocess 520. In particular, a feature vector, comprising the current value of each of the plurality of features, may be input to machine-learning model 455.

In subprocess 540, the output of machine-learning model 455, comprising or consisting of the value of the environmental parameter, may be output. As described with respect to subprocess 375 of process 300D, server application 112 may send the value of the environmental parameter, output by machine-learning model 455 in subprocess 370, over network(s) 120, to visual device 150.

5. Example Visual Device

Figure 6:
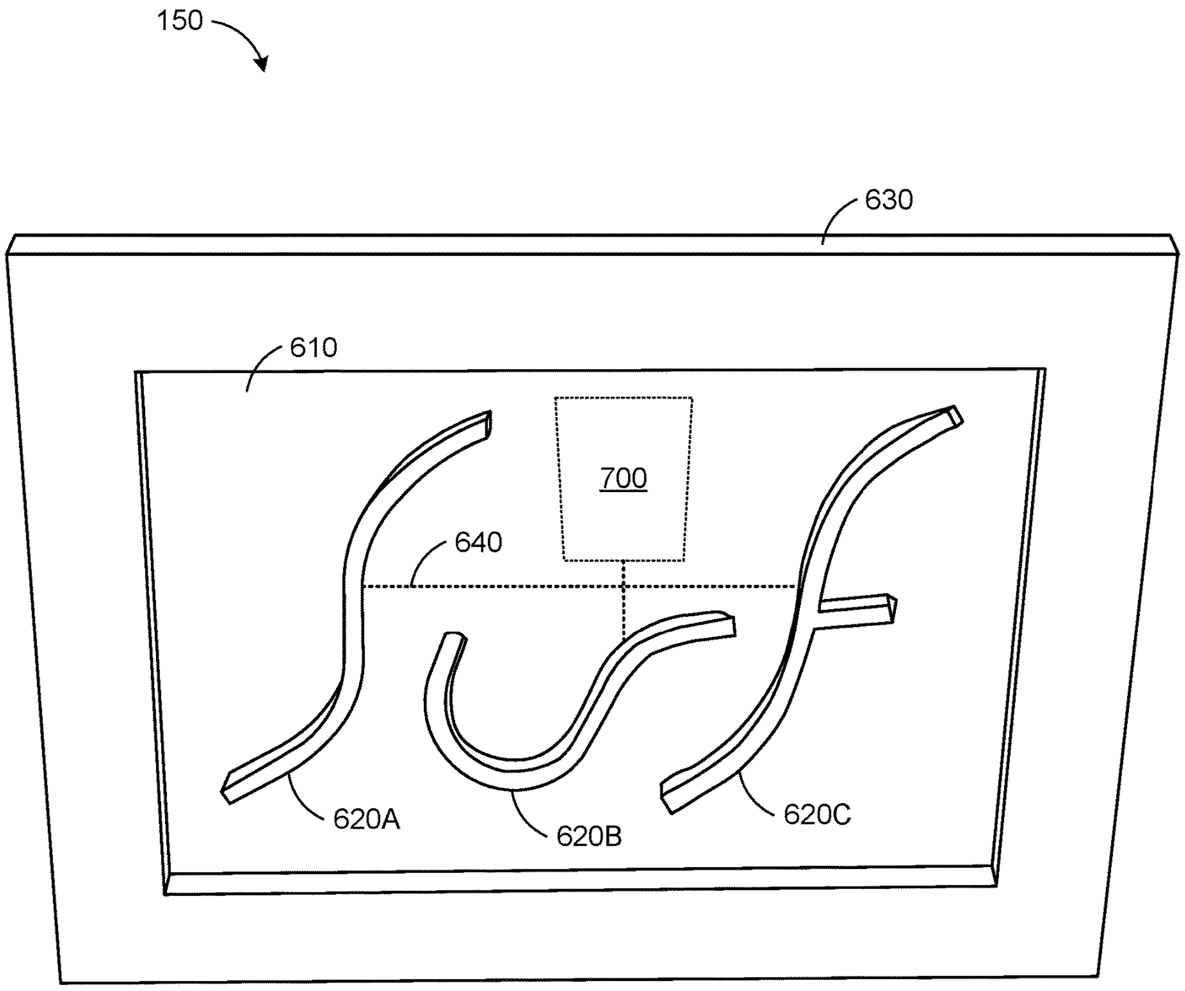
FIG. 6 illustrates a perspective view of a visual device that indicates the value of an environmental parameter, according to an embodiment.

FIG. 6 illustrates a perspective view of a visual device 150, according to an embodiment. Visual device 150 may comprise a substrate 610. Substrate 610 is illustrated as having a rectangular shape. However, substrate 610 may have any shape, including a circle, triangle, pentagon, hexagon, heptagon, octagon, nonagon, decagon, or the like. Substrate 610 may support a visual display comprising at least one illumination element 620.

Each illumination element 620, in the visual display of visual device 150, may be attached to and protrude outwards from a front surface of substrate 610. In the illustrated embodiment, the visual display consists of three distinct illumination elements 620A, 620B, and 620C. However, the visual display may comprise any number of illumination elements 620, including one, two, four, five, ten, twenty, one hundred, several hundred, one thousand, several thousand, or the like.

Each illumination element 620 may be configured to emit each of a plurality of colors of light within a color scale. For example, illumination element 620 may comprise one or a plurality of light-emitting elements. A light-emitting element may include, without limitation, a light-emitting diode (e.g., organic light-emitting diode), incandescent light bulb, fluorescent tube (e.g., compact fluorescent tube), neon cold-cathode tube, or the like. In a preferred embodiment, the light-emitting elements are light-emitting diodes (e.g., 12-volt light-emitting diodes). Each light-emitting element may be configured to emit each of the plurality of colors of light. Alternatively, different subsets of the light-emitting elements may each emit a different one of the plurality of colors of light, and each subset of light-emitting elements may be capable of being turned on or off, while the other subsets of light-emitting elements are turned off or on, respectively. As yet another alternative, visual device 150 may comprise a plurality of illumination elements 620 that are each configured to only emit a single one of the plurality of colors of light, which is different than the color of light emitted by the other illumination elements 620, and visual device 150 may be configured to turn each illumination element 620 on or off, while the other illumination elements 620 are turned off or on, respectively.

As illustrated, in an embodiment, the light-emitting elements in each of one or more illumination elements 620 may be arranged such that the illumination 620 forms a linear or curvilinear light strip. Collectively, illumination element(s) 620 may be formed in a shape that represents the activity to which the environmental parameter pertains. As an example, the activity may be a sport, such as board surfing, kite surfing, sailing, parasailing, snowboarding, skiing, hang-gliding, or the like. However, it should be understood that any activity, whether sport or non-sport, recreational or non-recreational, which may be affected by weather, can be represented in the shape of illumination element(s) 620. Even more generally, anything that can be affected by environmental data can be represented in the shape of illumination element(s) 620.

As one example, the shape of illumination element(s) 620 may depict an apparatus that is utilized in the activity, such as a surfboard for board surfing, a kite board for kite surfing, a sailboat for sailing, a parachute for parasailing, a snowboard for snowboarding, skis for skiing, a hang-glider for hang-gliding, or the like. Additionally or alternatively, the shape of illumination element(s) 620 may depict a person engaging in the activity, such as a person on a surfboard for board surfing, a person on a kite board for kite surfing, a person on a sailboat for sailing, a person in a parachute being pulled by a boat for parasailing, a person on a snowboard for snowboarding, a person on skis for skiing, a person in a hang-glider for hang-gliding, or the like.

As an alternative or additional example, illumination element(s) 620 may be formed in the shape of a string of characters that spell a word that is related to the activity. For example, in an embodiment in which the activity is a sport, the word may be the name of the sport, such as "surf" for board surfing or kite surfing, "sail" for sailing or parasailing, "snow" or "board" for snowboarding, "ski" for skiing, "hang" or "glide" for hang-gliding, or the like. The characters may be shaped stylistically to add artistic flair to visual device 150.

In the illustrated example, the visual display is formed in the shape of the word "surf," representing the sport of board surfing or kite surfing. In particular, illumination element 620A is formed in the shape of a stylistic "s," illumination element 620B is formed in the shape of a stylistic "ur," and illumination element 620C is formed in the shape of a stylistic "f" In this case, a plurality of illumination elements 620 are used to form distinct character sets in the word. However, in an alternative embodiment, a single illumination element 620 could be used to form the entire word (e.g., using cursive).

As illustrated, visual device 150 may also comprise frame 630 on or around substrate 610. Frame 630 may add dimension to visual device 150 and artfully hide the edges of substrate 610, as well as facilitate the mounting of visual device 150 on, for example, a wall. In an alternative embodiment, frame 630 may be omitted.

Visual device 150 may comprise a controller 700. Controller 700 may comprise processing system 200. It should be understood that controller 700 may perform all of the processing attributed to visual device 150. In particular, controller 700 may be configured, via software, hardware, or a combination of software and hardware, to perform subprocesses 330, 340, 365, 380, and 385. Controller 700 may be mounted on the rear surface of substrate 610, mounted on the rear surface of frame 630, embedded within substrate 610, or the like, such that controller 700 is not visible when viewing the visual display of visual device 150.

Controller 700 may be electrically connected to each illumination element 620 by at least one signal line 640, which may comprise a cable, conductive trace, or the like, on the front or rear surface of substrate 610 and/or embedded within substrate 610. Controller 700 may control each illumination element 620 via a single or respective signal line 640 to control the color of light emitted by the illumination element 620, turn the illumination element 620 on or off, and/or the like.

6. Example Controller for Visual Device

Figure 7:
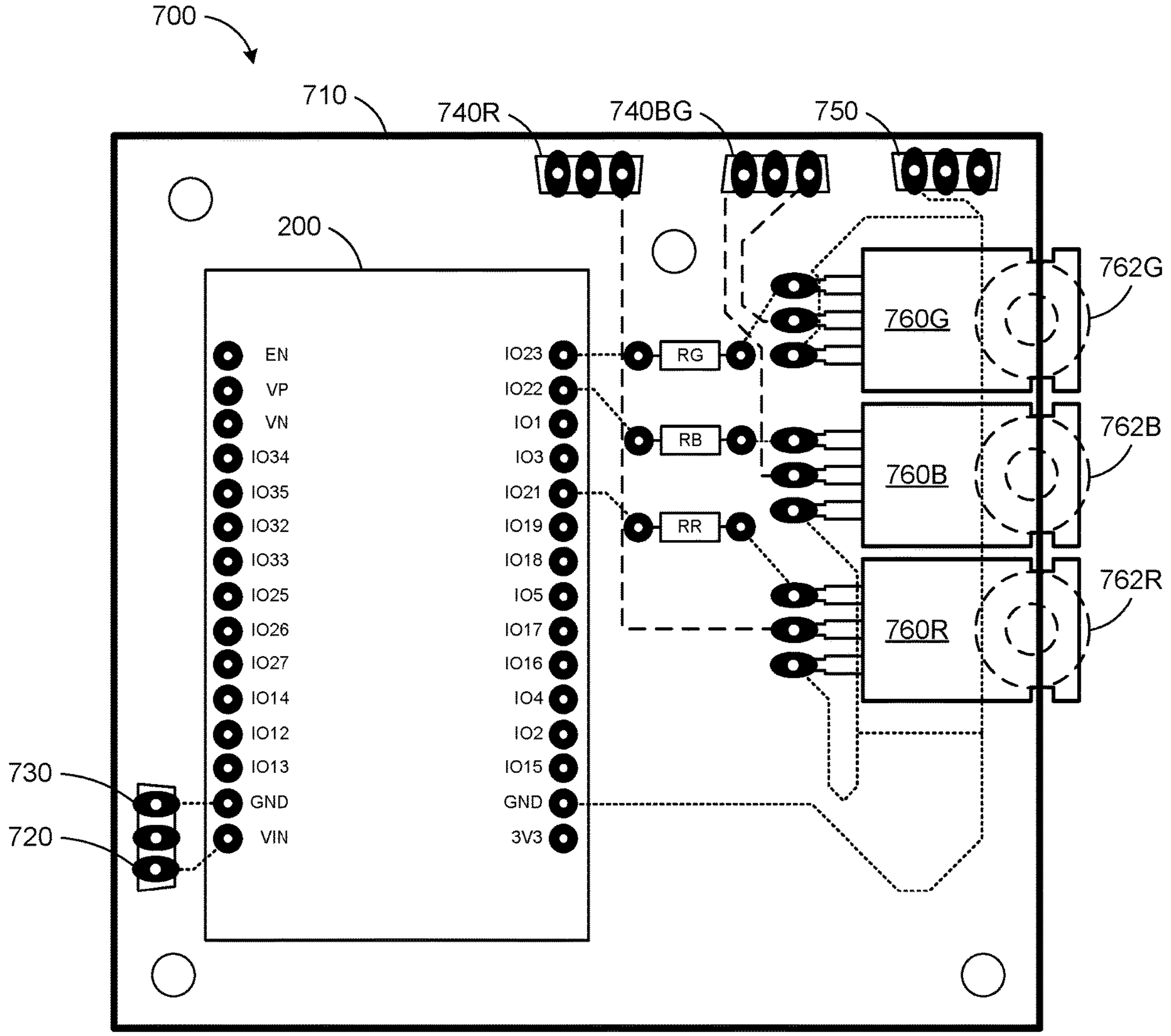
FIG. 7 illustrates a schematic of an example controller for a visual device that indicates the value of an environmental parameter, according to an embodiment.

FIG. 7 illustrates a schematic of an example of controller 700 for visual device 150, according to an embodiment. Controller 700 may comprise an electrical board 710 on which a plurality of components is mounted. The plurality of components may include a system 200, a power-supply terminal 720, a ground terminal 730, a red-light-power-supply terminal 740R, a blue-and-green-light-power-supply terminal 740BG, a ground terminal 750, and three transistors 760R, 760B, and 760G.

In an embodiment, system 200 of controller 700 comprises or consists of a system-on-a-chip microcontroller. As an example, system 200 of controller 700 may be an ESP32 microcontroller, manufactured by Espressif Systems of Shanghai, China. The ESP32 microcontroller is a low-power system-on-a-chip microcontroller with integrated Wi-Fi™ and dual-mode Bluetooth™ connectivity. System 200 of controller 700 may be preloaded with software application 152 (e.g., within main memory 215 and/or secondary memory 220), which may implement subprocesses 330, 340, 365, 380, and 385. To power system 200 of controller 700, a voltage-in (VIN) pin of system 200 may be conductively connected to power-supply terminal 720 (e.g., which is connected to a power source, such as a 5-volt power source), and a ground (GND) pin of system 200 may be conductively connected to ground terminal 730.

Each transistor 760 represents one of the primary colors of light: red; blue; or green. In particular, transistor 760R represents red, transistor 760B represents blue, and transistor 760G represents green. Transistor 760R may be conductively connected, via terminal 762R, to a signal line 640 that controls whether or not illumination element(s) 620 emit red light. Transistor 760B may be conductively connected, via terminal 762B, to a signal line 640 that controls whether or not illumination element(s) 620 emit blue light. Transistor 760G may be conductively connected, via terminal 762G, to a signal line 640 that controls whether or not illumination element(s) 620 emit green light.

Each transistor 760 may comprise three pins: a base pin for control; a collector pin for receiving current; and an emitter pin for draining current. The base pin controls the biasing of transistor 760 and can be used to turn transistor 760 on or off. The base pin of each transistor 760 may be conductively connected to a general purpose input/output (GPIO) pin of system 200 of controller 700 through a resistor. For example, the base pin of transistor 760R is conductively connected to the IO21 pin via a resistor RR, the base pin of transistor 760B is conductively connected to the IO22 pin via a resistor RB, and the base pin of transistor 760G is conductively connected to the IO23 pin via a resistor RG. As an example, each resistor RR, RB, and RG may have a resistance value of 560 ohms. The collector pin of each transistor 760 may be conductively connected to a respective power-supply terminal. For example, the collector pin of transistor 760R is conductively connected to red-light-power-supply terminal 740R, and the collector pins of transistors 760B and 760G are each conductively connected to blue-and-green-light-power-supply terminal 740BG. The emitter pin of each transistor 760 may be conductively connected to ground terminal 750. When a small current is applied to the base pin of transistor 760 (i.e., via the connection to a GPIO pin), a much larger current is caused to flow, through the collector-emitter pins, from the respective power-supply terminal 740 (e.g., which is connected to a power source, such as a 5-volt power source) to ground terminal 750. As an example, each transistor 760 may be a TIP120 transistor, which is an NPN Darlington transistor.

In the illustrated configuration, system 200 may turn the red light on by supplying an output signal from the IO21 pin to transistor 760R. This causes transistor 760R to output a signal, via signal line 640, that causes illumination element(s) 620 to emit red light. Conversely, system 200 may turn the red light off by turning off the output signal from the IO21 pin to transistor 760R. This causes transistor 760R to turn off the signal on signal line 640, thereby causing illumination element(s) 620 to not emit red light.

Similarly, system 200 may turn the blue light on by supplying an output signal from the IO22 pin to transistor 760B. This causes transistor 760B to output a signal, via signal line 640, that causes illumination element(s) 620 to emit blue light. Conversely, system 200 may turn the blue light off by turning off the output signal from the IO22 pin to transistor 760B. This causes transistor 760B to turn off the signal on signal line 640, thereby causing illumination element(s) 620 to not emit blue light.

Similarly, system 200 may turn the green light on by supplying an output signal from the IO23 pin to transistor 760G. This causes transistor 760G to output a signal, via signal line 640, that causes illumination element(s) 620 to emit green light. Conversely, system 200 may turn the green light off by turning off the output signal from the IO23 pin to transistor 760G. This causes transistor 760G to turn off the signal on signal line 640, thereby causing illumination element(s) 620 to not emit green light.

It should be understood that system 200 may mix the red, blue, and green (RGB) light colors to form additional light colors. For example, red and blue may be mixed to form magenta, red and green may be mixed to form yellow, blue and green may be mixed for form cyan, and red, blue, and green may be mixed to form white. Thus, in the illustrated embodiment, the visual display of visual device 150 has a color scale of seven different colors: red, blue, green, magenta, yellow, cyan, and white. As a result, anywhere from one to seven different values of the environmental parameter may be indicated by visual device 150. In other words, the number of enumeration values can be anywhere from one to seven.

In an alternative embodiment, visual device 150 may be configured to emit fewer or more light colors. For example, one or more transistors 760 and associated components may be removed to decrease the number of possible light colors, or one or more transistors 760 and associated components may be added for additional light colors. Alternatively or additionally, components may be added to controller 700 to enable controller 700 to scale the amount of each light color that is emitted, to significantly widen the color scale by enabling the mixing of different amounts of each light color (e.g., red, blue, and green).

Using surf condition as an example of the environmental parameter, the value-to-color mapping in the following table may be used as a default:

| Value | Color | Surf Condition |
|---|---|---|
| 0 | None/White | Sleep mode (e.g., for a time range between sunset and sunrise), in which the visual device emits no light or a fixed light color, such as white. The time range and light options may be configurable by the user. |
| 1 | Blue | Poor |
| 2 | Cyan | Fair |
| 3 | Green | Good |
| 4 | Yellow | Ideal |
| 5 | Red | Dangerous |

The value-to-color mapping, used by controller 700, may be stored in memory (e.g., main memory 215 and/or secondary memory 220) of system 200 of controller 700. The value-to-color mapping may be modified by the user via a direct connection between user system 130 and the local access point of visual device 150, either in process 300B (e.g., in the connection configuration), or at some other time. In the event of the latter, user system 130 may connect to visual device 150 in the same or similar manner as described with respect to subprocess 325. The user may then utilize a graphical user interface, provided by the software server of software application 152, executing on controller 700, to modify the value-to-color mapping, for example, by assigning a color (e.g., via a drop-down menu that lists every color in the available color scale) to each of the plurality of enumeration values for the environmental parameter, and submitting the assignments via an input of the graphical user interface. In an alternative or additional embodiment, the user may sign in to the user's user account on server application 112 and specify the value-to-color mapping in the device configuration, in the same or similar manner as described above, and then platform 110 may send the value-to-color mapping to the visual device 150 associated with that device configuration, either ad hoc or the next time that visual device 150 requests the value of the environmental parameter in subprocess 365.

7. Validation and Feedback

In an embodiment, users may be able to validate the values of the environmental parameter against their own or otherwise known observations. For example, a user may sign in to the user's user account on server application 112. The graphical user interface, provided by server application 112, may comprise one or more screens with one or more inputs by which the user can view, for a selected device configuration, the current value of the environmental parameter in real time and/or historical values of the environmental parameter at one or more past times. The user can validate a current value of the environmental parameter against a current observation. For example, the user may be present in the environment (e.g., beach) and compare the current value of the environmental parameter to the current, actual, and observed environmental condition (e.g., surf condition). Similarly, the user can validate a historical value of the environmental parameter against a past observation. For example, the user may compare the historical value of the environmental parameter to a known, actual, and observed environmental condition (e.g., from the user's past observation within the environment, weather reports, etc.).

For easier comprehension and validation, the historical values of the environmental parameter may be displayed in a graphical format. For example, the historical values of the environmental parameter may be displayed as a time series in a chart that plots the value of the environmental parameter over time. Thus, the user can easily compare the values of the environmental parameter over time with known environmental conditions at those times.

In an embodiment, users may be able to submit feedback about the values of the environmental parameter. For example, a user may sign in to the user's user account on server application 112. The graphical user interface, provided by server application 112, may comprise one or more screens with one or more inputs by which the user can provide feedback. The feedback may represent the results of the user's validation, as described above. For example, the feedback may comprise a time (e.g., day and time, represented as a timestamp) and the value or other representation of the environmental parameter that was actually observed at that time. The feedback could also comprise the value of the environmental parameter that was calculated by server application 112 for that time, and/or an indication of whether or not the actual value and the calculated value matched each other.

The feedback may be used to improve the calculations of values of the environmental parameter in subprocess 370. For example, in an embodiment that utilizes a machine-learning model, server application 112 may extract the values of the plurality of features from the environmental data for the time provided in the feedback, generate a feature vector that comprises the values of the plurality of features and is labeled with the value of the environmental parameter that was actually observed at the time provided in the feedback, and add the labeled feature vector to a new training dataset 415. Once a significant amount of feedback has been collected and converted into labeled feature vectors for the new training dataset 415, machine-learning model 455 may be retrained in subprocess 420 using the new training dataset 415, reevaluated in subprocess 430, and redeployed in subprocess 450 when deemed acceptable in subprocess 440. Thus, the calculations in subprocess 370 may improve over time as feedback is collected from users.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A visual device comprising:
- a visual display comprising at least one illumination element configured to emit light in each of a plurality of colors; and
- a controller electrically connected to the visual display, wherein the controller is configured to periodically execute an operation that comprises
  - receiving a value of an environmental parameter from a remote platform over at least one network, and
  - controlling the at least one illumination element to emit light in one of the plurality of colors that is associated with the value of the environmental parameter,
- wherein the controller comprises a local access point, and wherein the controller is further configured to execute a software server that provides a service at a fixed address accessible via the local access point, wherein the software server is configured to
  - generate a graphical user interface with one or more inputs for inputting a connection configuration,
  - receive the connection configuration via the graphical user interface, and
  - establish a connection with the remote platform, through the at least one network, based on the connection configuration.

2. The visual device of claim 1, wherein the operation further comprises sending a request to the remote platform over the at least one network, and wherein the value of the environmental parameter is received in response to the request.

3. The visual device of claim 1, wherein the value of the environmental parameter is one of a finite plurality of enumeration values, and wherein each of the finite plurality of enumeration values is associated with a different one of the plurality of colors than the other ones of the finite plurality of enumeration values.

4. The visual device of claim 1, wherein the environmental parameter represents a weather condition in a beach environment.

5. The visual device of claim 4, wherein the weather condition is a surf condition.

6. The visual device of claim 1, wherein periodically executing the operation comprises executing the operation after each of a plurality of time intervals.

7. The visual device of claim 1, wherein the controller comprises a wireless communication interface that is configured to connect to the at least one network via a wireless connection.

8. The visual device of claim 1, wherein the connection configuration comprises access information for the at least one network.

9. The visual device of claim 8, wherein the connection configuration comprises a user identifier and credentials for a user account on the remote platform.

10. The visual device of claim 1, wherein the local access point is configured to:
- connect directly to a user system via a wireless connection; and
- provide the graphical user interface to the user system via the wireless connection.

11. The visual device of claim 1, further comprising a substrate, wherein the at least one illumination element is attached to and protrudes outwards from a surface of the substrate.

12. The visual device of claim 11, wherein the at least one illumination element is formed in a shape that represents a sport.

13. The visual device of claim 12, wherein the sport is board surfing, kite surfing, sailing, parasailing, snowboarding, skiing, or hang-gliding.

14. The visual device of claim 11, wherein the at least one illumination element is formed in a shape of a string of characters that spell a word.

15. The visual device of claim 14, wherein the word is a name of a sport.

16. A system comprising:
- one or more visual devices, each comprising
  - a visual display comprising at least one illumination element configured to emit light in each of a plurality of colors, and
  - a controller electrically connected to the visual display, wherein the controller is configured to periodically execute an operation that comprises receiving a value of an environmental parameter from a remote platform over at least one network, and controlling the at least one illumination element to emit light in one of the plurality of colors that is associated with the value of the environmental parameter; and
- the remote platform, wherein the remote platform is configured to, for each of the one or more visual devices,
  - acquire a device configuration associated with the visual device, wherein the device configuration defines an environment and the environmental parameter,
  - acquire environmental data from at least one data source,
  - calculate the value of the environmental parameter based on the device configuration and the environmental data, and
  - send the value of the environmental parameter to the controller of the visual device,
- wherein the remote platform is further configured to, for each of the one or more visual devices,
  - receive a registration request from the visual device, wherein the registration request comprises a device identifier of the visual device,
  - associate the device identifier with a user identifier of a user account within a server database of the remote platform, and
  - associate the device identifier with a device configuration within the server database, to thereby associate the visual device with the device configuration.

17. A system comprising:
- one or more visual devices, each comprising
  - a visual display comprising at least one illumination element configured to emit light in each of a plurality of colors, and a controller electrically connected to the visual display, wherein the controller is configured to periodically execute an operation that comprises receiving a value of an environmental parameter from a remote platform over at least one network, and controlling the at least one illumination element to emit light in one of the plurality of colors that is associated with the value of the environmental parameter; and the remote platform, wherein the remote platform is configured to, for each of the one or more visual devices, acquire a device configuration associated with the visual device, wherein the device configuration defines an environment and the environmental parameter, acquire environmental data from at least one data source, calculate the value of the environmental parameter based on the device configuration and the environmental data, and send the value of the environmental parameter to the controller of the visual device, wherein calculating the value of the environmental parameter based on the device configuration and the environmental data comprise extracting values of a plurality of features from the environmental data, based on the device configuration, and inputting the values of the plurality of features to a machine-learning model, which is trained to output the value of the environmental parameter based on the values of the plurality of features, to thereby produce the value of the environmental parameter.

* * * * *